US006240963B1

(12) United States Patent
Mayer

(10) Patent No.: US 6,240,963 B1
(45) Date of Patent: Jun. 5, 2001

(54) ROLL-OFF SELF-POWERED FUEL DISPENSING PLATFORM SYSTEM

(75) Inventor: Jon Graham Mayer, Wayzata, MN (US)

(73) Assignee: Lubes Unlimited, Inc., Long Lake, MN (US)

( * ) Notice: Subject to any disclaimer, the term of this patent is extended or adjusted under 35 U.S.C. 154(b) by 0 days.

(21) Appl. No.: 09/436,299

(22) Filed: Nov. 8, 1999

(51) Int. Cl.[7] ..................................................... A01G 25/09

(52) U.S. Cl. ................. 137/899; 137/899.4; 137/355.12; 280/838; 417/361

(58) Field of Search ................................ 137/899, 899.4, 137/355.12; 280/838; 417/361, 423.1, 423.16, 360

(56) References Cited

U.S. PATENT DOCUMENTS

| | | | | |
|---|---|---|---|---|
| 4,430,028 | * | 2/1984 | Clayton et al. | 406/39 |
| 4,708,179 | * | 11/1987 | Beaty | 141/388 |
| 4,774,979 | * | 10/1988 | McKeon et al. | 137/351 |
| 4,828,033 | * | 5/1989 | Frison | 166/307 |
| 4,976,278 | * | 12/1990 | Ripley et al. | 137/15 |
| 5,052,443 | * | 10/1991 | Evangelist, Jr. | 137/899 |
| 5,577,772 | * | 11/1996 | Kaiser | 280/838 |
| 5,577,895 | * | 11/1996 | Franklin et al. | 417/238 |
| 5,692,884 | * | 12/1997 | Allen et al. | 417/361 |

* cited by examiner

*Primary Examiner*—A. Michael Chambers
*Assistant Examiner*—Thomas L. McShane
(74) *Attorney, Agent, or Firm*—Hugh D. Jaeger

(57) ABSTRACT

A roll-off self-powered fuel dispensing platform system which is transportable, deployable, and made operable by a single individual, from a vehicle such as a truck and which includes a roll-off platform assembly, a roller assembly, and a large planar base. A plurality of essential and sensitive components including a fuel vessel, a fuel pumping and metering unit, a pivotally collapsible gravity operated fuel distribution hose support, a fuel distribution hose having a fuel nozzle, and an area lighting apparatus including a pivotally collapsible light standard and a light are mounted on the large planar base. These essential and sensitive components are all confined within a security fence which is mounted on the large planar base around the perimeter thereof. The security fence includes front and side access doors or gates. Located outside the security fence along one side thereof is a pivotable arm assembly which at one end carries a generator platform that extends beneath the front access door or gate of the security fence and into the area confined by the security fence when the roll-off self-powered fuel dispensing platform system is in its transport or storage mode. The generator platform supports an electric generator and a fire extinguisher. Upon opening the front access door or gate, the pivotable arm assembly is movable to relocate the electric generator and the fire extinguisher from within the security fence to a position outside the security fence at a distance away from the fuel vessel and the fuel pumping and metering unit for the operation mode to promote safety during operation.

13 Claims, 5 Drawing Sheets

ROLL-OFF SELF-POWERED FUEL DISPENSING PLATFORM SYSTEM

CROSS REFERENCES TO CO-PENDING APPLICATIONS

None.

BACKGROUND OF THE INVENTION

1. Field of the Invention

The present invention is for a roll-off self-powered fuel dispensing platform system which functions as a portable self-powered fuel dispenser, and in particular is for a roll-off self-powered fuel dispensing platform system which is operated and placed by a single operator, which is transportable upon and deployable from a vehicle such as a truck or other appropriately configured transport device, and which has an electrical power source that is pivotally relocatable at a safe distance from a fuel vessel and a fuel pumping and metering unit.

2. Description of the Prior Art

None.

SUMMARY OF THE INVENTION

The general purpose of the present invention is to provide a roll-off self-powered fuel dispensing platform system. The roll-off self-powered fuel dispensing platform system includes a roll-off platform assembly having a rectangular base upon which a fuel vessel, a fuel pumping and metering unit, an area lighting apparatus, a fire extinguisher and an electric generator mounted on a pivotable arm assembly, and other components are mounted. For safety and for fire or other codes, it is desirable to have the fuel vessel and the fuel pumping and metering unit located at a distance from any sources which could promote fire or explosion such as, but not limited to, the electric generator and its exhaust system. The pivotable arm assembly provides a means for easily and readily moving the electric generator to a location distant from the fuel vessel and the fuel pumping and metering unit prior to starting of the generator and use of the fuel pumping and metering unit. The area lighting apparatus includes a pivotally collapsible light standard and a light for illumination for use of the invention at night; and a security fence is provided to deter theft and vandalism of essential and sensitive components of the invention. The roll-off self-powered fuel dispensing platform system can be delivered, deployed and operated by a single operator. The invention can also function with electrical power provided by another external and outside source if nearby electrical power is available for use and if the electrical generator is not required or desired.

According to one embodiment of the present invention, there is provided a roll-off self-powered fuel dispensing platform system including a roll-off platform assembly and such elements as a security fence including access doors or gates, a pivotally collapsible light standard and a light, a pivotally collapsible gravity operated fuel distribution hose support, a fuel vessel, a fuel pumping and metering unit, and a pivotable arm assembly, all of which secure to the base the roll-off platform or ending of and comprise the majority of the members of the roll-off platform assembly. An electric generator and a fire extinguisher are secured to a generator platform located on one end of the pivotable arm assembly.

One significant aspect and feature of the present invention is a roll-off self-powered fuel dispensing platform system which is portable, self-powered and self-contained.

Another significant aspect and feature of the present invention is a roll-off self-powered fuel dispensing platform system which includes a fuel vessel, a fuel pumping and metering unit, and an electric generator mounted to the base of a roll-off platform assembly, with the electric generator being mounted on a pivotable arm assembly which is moveable to distance and locate the electric generator away from the fuel vessel and the fuel pumping and metering unit prior to operation.

Still another significant aspect and feature of the present invention is an area lighting apparatus for operation of the invention at night.

Yet another significant aspect and feature of the present invention is a security fence surrounding the inwardly located essential and sensitive components of the invention.

A further significant aspect and feature of the present invention is a roll-off self-powered fuel dispensing platform system which can be delivered, deployed from a vehicle and set up by a single operator.

Having thus described embodiments and significant aspects and features of the present invention, it is the principal object of the present invention to provide a roll-off self-powered fuel dispensing platform system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
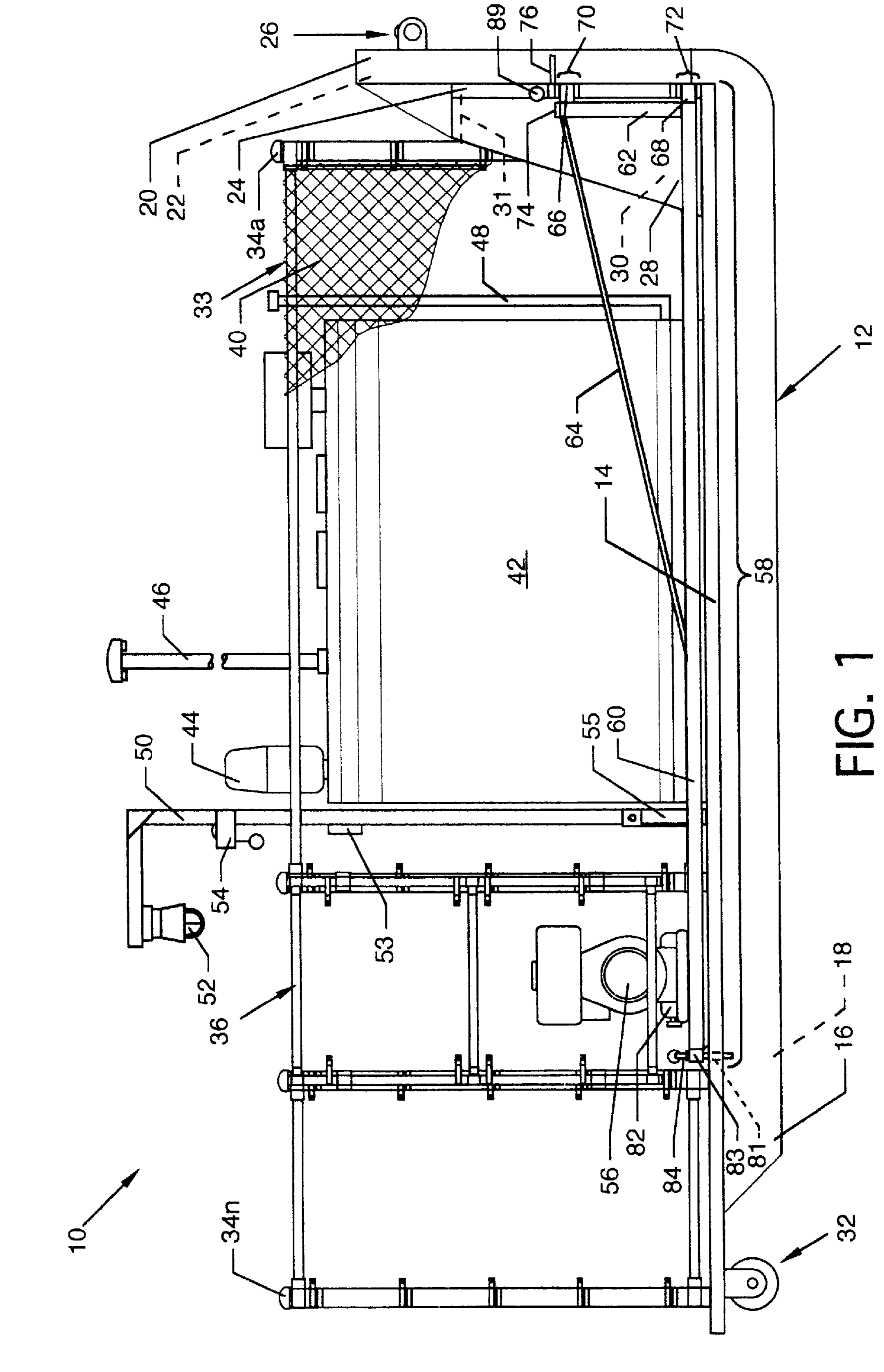
FIG. 1 illustrates a front view of a roll-off self-powered fuel dispensing platform system, the present invention.

FIG. 1 illustrates a front view of a roll-off self-powered fuel dispensing platform system 10. A plurality of components secure to a suitable portable and mobile structure, which in this case is a roll-off platform assembly 12 such as that which is transportable upon and deployable from a truck or other vehicle. Although a roll-off platform assembly 12, such as normally used with roll-off devices, is exemplified as the suitable portable and mobile structure, other suitable portable and mobile structures such as a truck bed, a rail car flat bed or other such structure which can be readily transported can be utilized as a suitable structure, and therefore the use of a roll-off platform assembly 12 shall not be deemed to be limiting to the scope of the invention. The roll-off platform assembly 12 includes a large planar base 14, skids 16 and 18 secured and distributed horizontally along the bottom of the base 14, upwardly and inwardly extending box tubes 20 and 22 secured to one end of the skids 16 and 18 and to a vertically oriented support plate 24 mounted on the base 14, a forward hooking assembly 26 secured to the box tubes 20 and 22 for use in pulling or otherwise transporting the roll-off platform assembly 12, vertically aligned support plates 28 and 30 secured between the support plate 24 and the base 14, a support plate 31 located between the tops of the support plates 24, 28, 30, and a roller assembly 32 including a plurality of rollers secured to the bottom of the base 14. A security fence 33 mounted on the base 14 surrounds the essential and sensitive components of the roll-off self-powered fuel dispensing platform system 10. The security fence 33 is located at the perimeter of the base 14 and includes a plurality of standards 34*a*14 34*n* including fence support structure secured to the base 14, a front access door or gate 36, a side access door or gate 38 (FIG. 2), and woven wire mesh 40 (only partially shown) appropriately located and supported between the standards 34*a*–34*n* and the fence support structure. Woven wire mesh 40 also spans the access doors or gate 36 and 38. Some of the essential and sensitive components include a fuel vessel or fuel tank 42 secured to the base 14, a fuel pumping and metering unit 44, (i.e., a pump and meter combination) a fuel distribution hose 92 (FIG. 3), a readily and easily removable vent 46, and a filler tube 48. Other essential and sensitive components viewable in FIG. 1 are adjacently located components including a pivotally collapsible light standard 50, a light 52 and a light switch 53 both of which are explosion proof, a pivotally collapsible gravity operated distribution hose support 54, and a fuel nozzle support 55.

Figure 2:
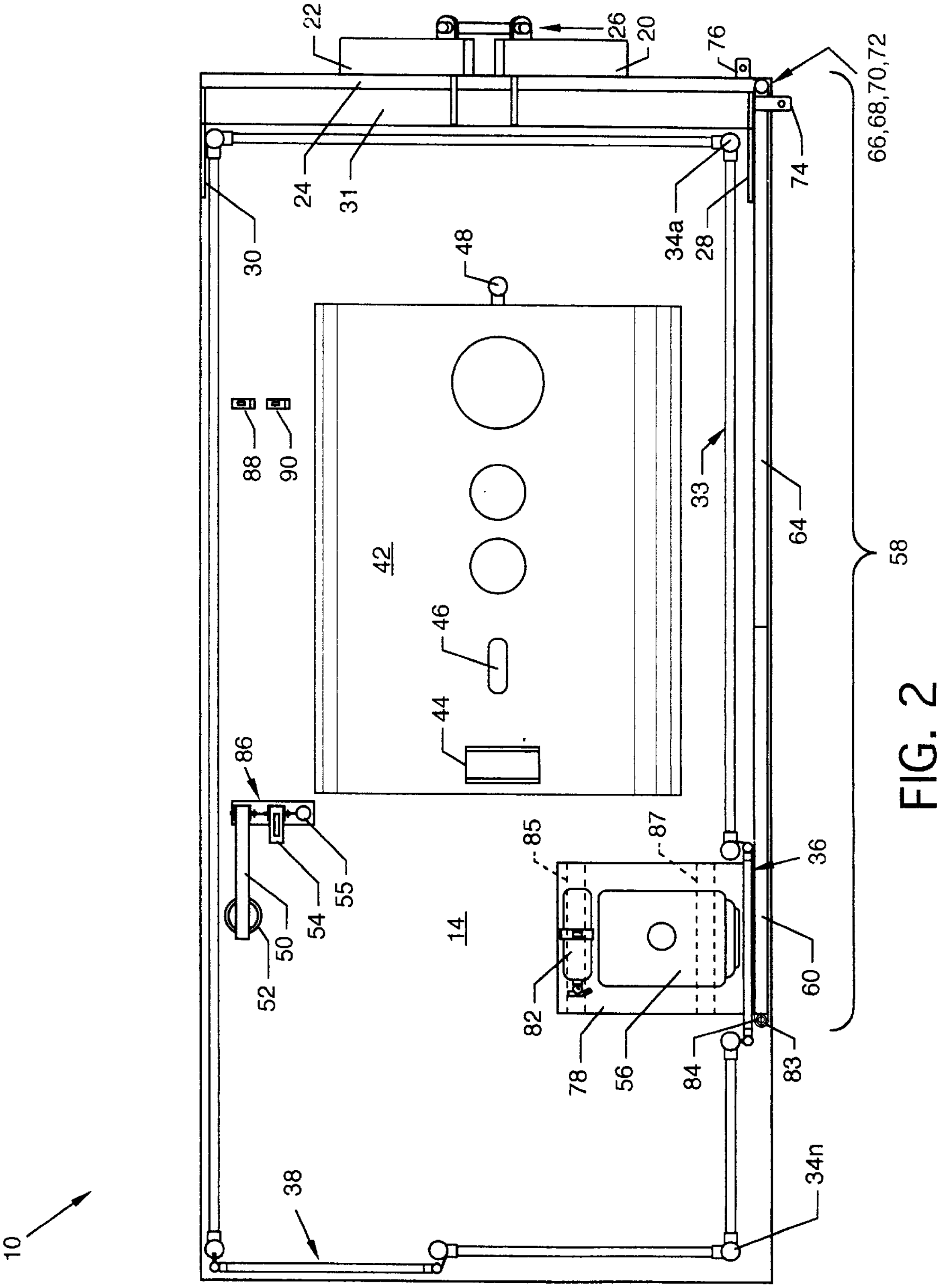
FIG. 2 illustrates a top view of the roll-off self-powered fuel dispensing platform system.
Figure 3:
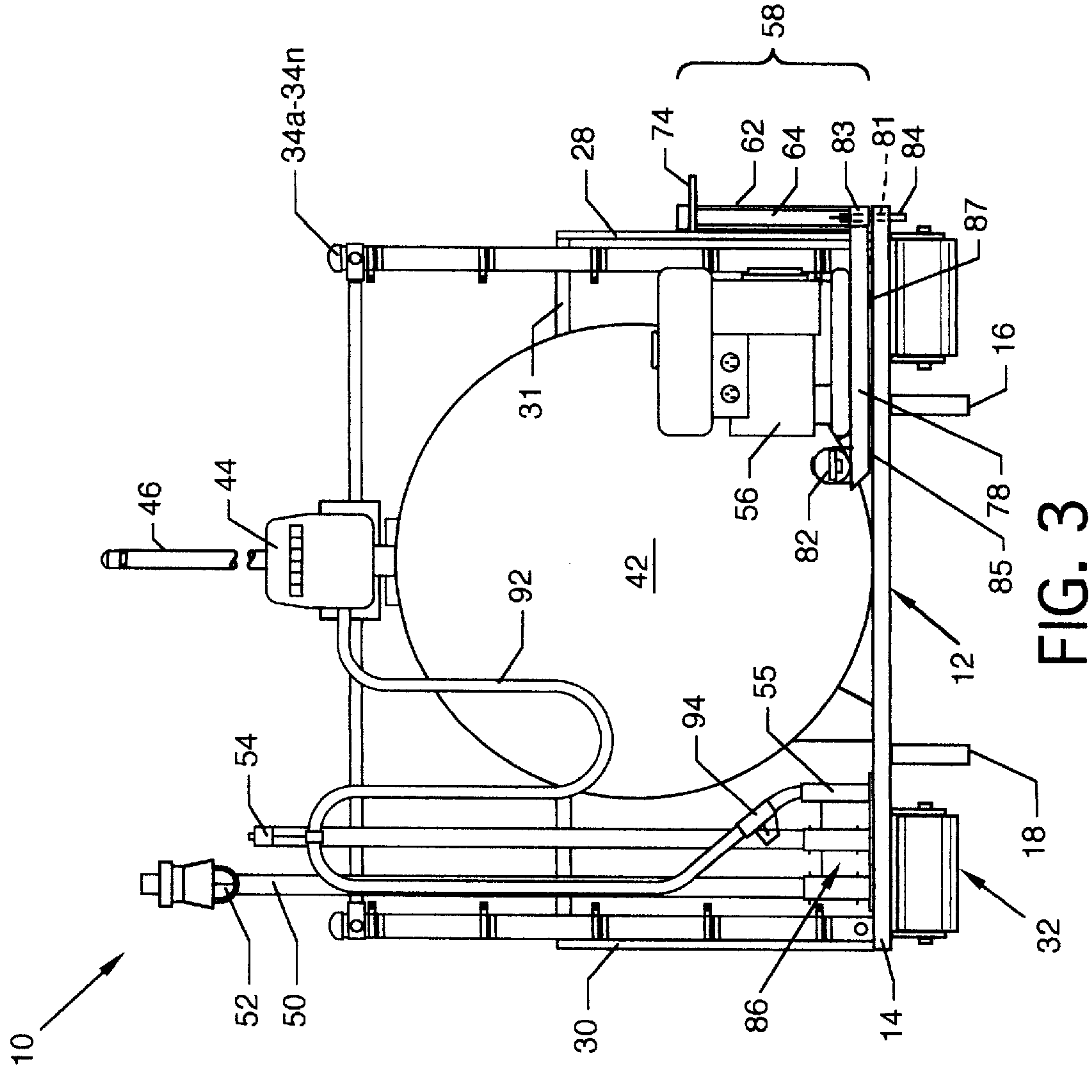
FIG. 3 illustrates a left end view of the roll-off self-powered fuel dispensing platform system with various fencing and door or gate components not shown.

With reference to FIGS. 1 and 2, another sensitive component, a means for powering the pump, shown as an electric generator 56, which also is protected behind the security fence 33, is now described. The electric generator 56, when not functioning and for purposes of transport or for protection against theft or vandalism, is housed behind the security fence 33 in general, and more specifically, is located just behind the front access door or gate 36. A pivotable arm assembly 58 at a forward end is provided for support of the electric generator 56 at all times including storage, transportation, and for distanced support during operation of the electric generator 56 for pumping or other uses. The pivotable arm assembly 58 includes a horizontally oriented pivot arm 60, a vertically oriented support tube 62 the lower end of which secures to the pivot arm 60, a support bar 64 secured at one end to the upper region of the support tube 62 and at the other end to a mid portion of the support bar 60, vertically oriented pivot housings 66 and 68 secured to the upper and lower end regions of the support tube 62, upper and lower pivot brackets 70 and 72 secured to the support plate 24, and pivot pins (not illustrated) passing through the pivot housings 66 and 68 and pivot brackets 70 and 72, respectively, to pivotally connect the pivotable arm assembly 58 to the base 14 via the support plates 24 and 28. A locking tab 74 having a body hole secures to and extends outwardly towards the viewer from the upper region of the vertical support tube 62 and another locking tab 76 having a body hole extends sideways from the support plate 24, the uses of which are described later in detail. A generator platform 78, part of the pivot arm assembly 58, secures to and extends horizontally and inwardly from the left end of the pivot arm 60, as also shown in FIG. 3. The generator platform 78 also extends beneath the bottom of the front access door or gate 36. The electric generator 56 and a fire extinguisher 82 mount to the upper side of the generator platform 78 and are protectively located inwardly from and behind the front access door or gate 36. A removable pin 84 extends through a cylindrical sleeve 83 secured to the left end of the pivot arm 60 and through an aligned hole 81 in the base 14 to secure the left end of the pivotable arm assembly 58 from rotation about the pivot structure adjacent to the support tube 62 during periods of transport or storage. The removable pin 84 is also utilized during operation of the invention, as later described in detail. Teflon support bars 85 and 87 shown in dashed lines in FIG. 2 are secured to the bottom of the generator platform 78 to provide for support of the electric generator 56, the fire extinguisher 82 and the generator platform 78 in intimate contact with the base 14 located at the left end of the pivot arm 60. Such support is especially desirable during transportation of the roll-off self-powered fuel dispensing platform system 10 to relieve vertical transportational stresses on the pivotal arm assembly 58. A properly housed (explosion proof) electrical power line (not illustrated) is routed from the electric generator 56 along the pivot arm 60, upwardly along the support bar 64 and through an orifice 89 (FIG. 1) extending through the support plate 24 to the required areas such as, but not limited to, the light 52 and the fuel pumping and metering unit 44. The pivotally collapsible light standard 50, the pivotally collapsible gravity operated fuel distribution hose support 54 and the fuel nozzle support 55 are part of a support assembly 86, best shown in FIG. 3. The support assembly 86 provides structure for the support of the pivotally collapsible light standard 50 and the pivotally collapsible gravity operated fuel distribution hose support 54, each of which utilizes a pivot and a locking pin extending through the structure of the support assembly 86, and for the fuel nozzle support 55. Clamps 88 and 90 are secured to the base 14 to secure the pivotally collapsible light standard 50 and the pivotally collapsible gravity operated fuel distribution hose support 54, respectively, in the collapsed position such as for transport of the roll-off self-powered fuel dispensing platform system 10.

FIG. 3 illustrates a left end view of the roll-off self-powered fuel dispensing platform system 10, where all numerals correspond to those previously or otherwise described. The security fence woven wire mesh 40 is not shown and several of the standards 34*a*–34*n* and the access doors or gates 36 and 38 are not shown for the purpose of brevity and clarity. Illustrated in particular is the relationship of the pivotable arm assembly 58 to the components of the roll-off platform assembly 12. In particular, the Teflon support bars 85 and 87 of the generator platform 78, having the electric generator 56 and the fire extinguisher 82 attached thereto, are shown in intimate relationship with the upper surface of the base 14.

Also illustrated in FIG. 3 is the fuel distribution hose 92 connecting between the fuel pumping and metering unit 44 and a fuel nozzle 94. The pivotally collapsible gravity operated fuel distribution hose support 54 supports the fuel distribution hose 92; and the fuel nozzle 94 is supported by the fuel nozzle support 55 located at one end of the support assembly 86.

Figure 4:
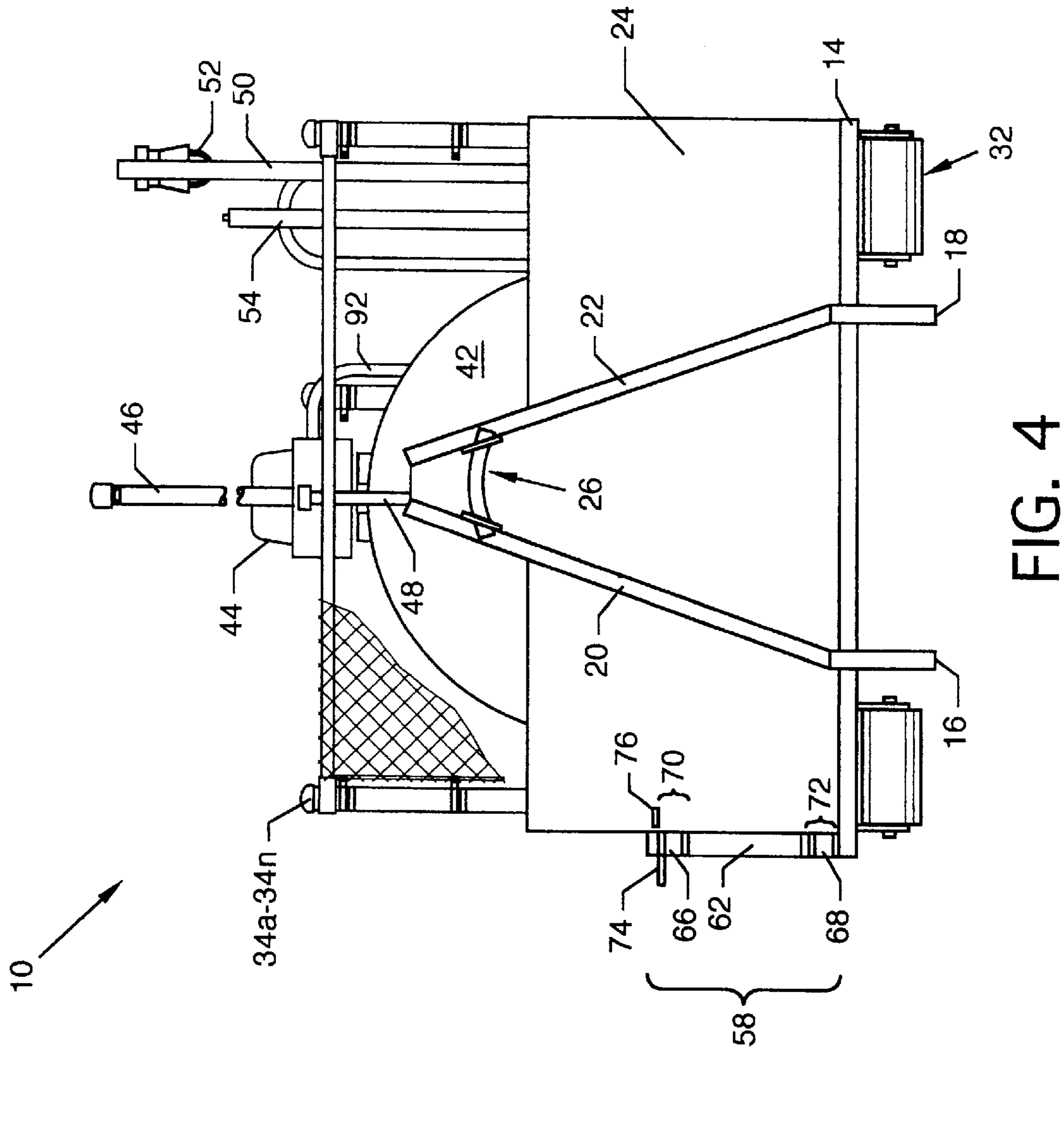
FIG. 4 illustrates a right end view of the roll-off self-powered fuel dispensing platform system with various fencing and door or gate components not shown; and, FIG. 5 illustrates the mode of operation of the roll-off self-powered fuel dispensing platform system with the electric generator distanced from the centrally located components by the pivotable arm assembly.

FIG. 4 illustrates a right end view of the roll-off self-powered fuel dispensing platform system 10, where all numerals correspond to those previously or otherwise described. Shown in particular is the hooking assembly 26 secured to the box tubes 20 and 22. Also shown in the illustration is the relationship of the locking tab 74 on the support tube 62 to the locking tab 76 extending from the support plate 24.

MODE OF OPERATION

Figure 5:
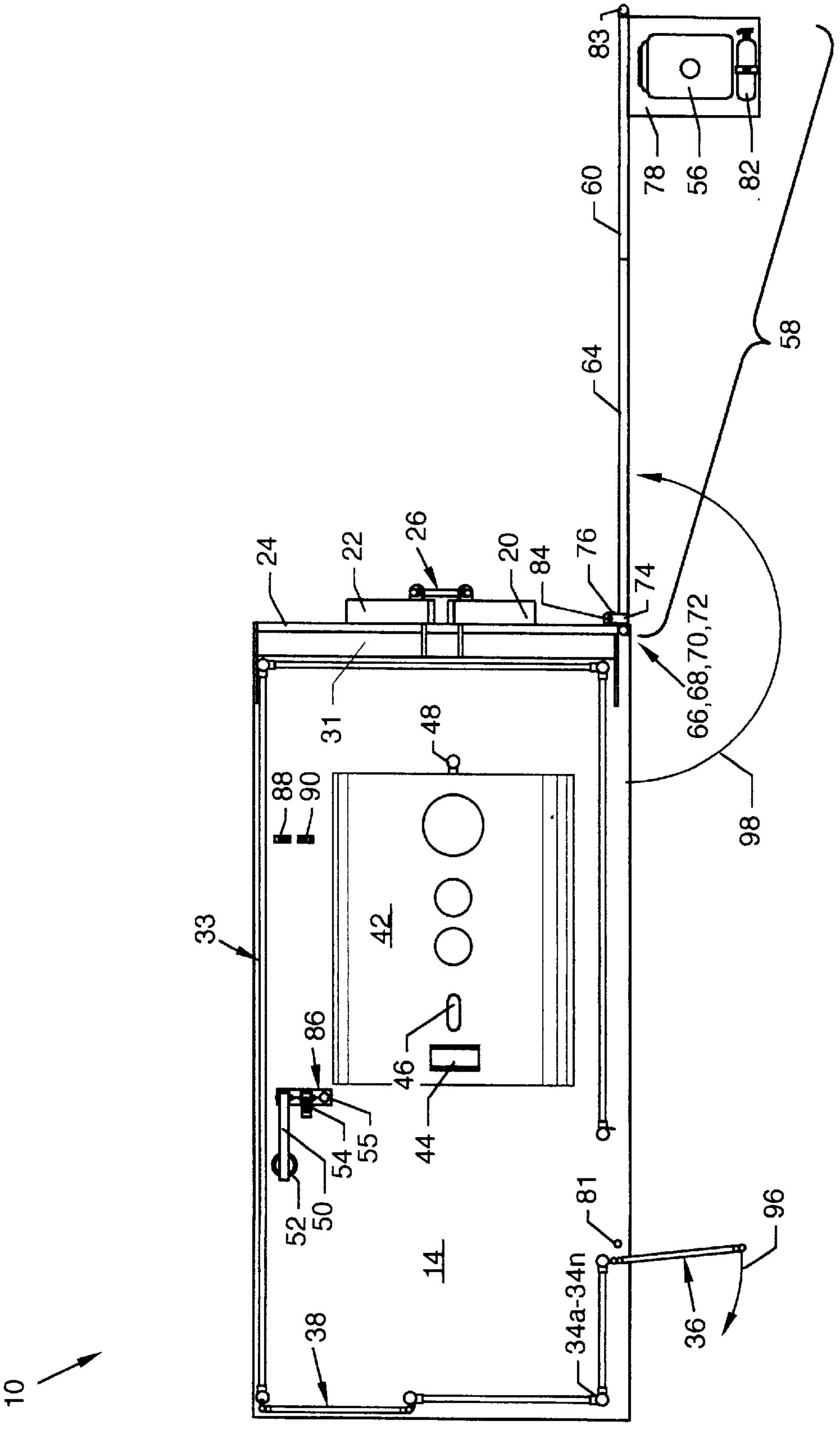

FIGS. 2 and 5 illustrate the mode of operation of the roll-off self-powered fuel dispensing platform system 10, where all numerals correspond to those previously or otherwise described. FIG. 2 illustrates, with the exception of the pivotally collapsible light standard 50, the pivotally collapsible gravity operated fuel distribution hose support 54, and the vent 46, the configuration of the roll-off self-powered fuel dispensing platform system 10 in the transport or storage mode. In the transport mode, and in the storage mode if desired, the pivotally collapsible light standard 50 and the pivotally collapsible gravity operated fuel distribution hose support 54 would be pivoted about the support assembly 86 and secured to the base 14 in a substantially horizontal position by the clamps 88 and 90, respectively; and the vent 46 would be removed to present a low profile for vertical clearance during transport. The pivotable arm assembly 58 is secured in a position parallel to and just above the front edge of the base 14 by the pin 84 extending through the cylindrical sleeve 83 at the left end of the pivot arm 60. The majority of the generator platform 78 is subsequently fixed in position inwardly behind the front access door or gate 36, and a portion of the generator platform 78 extends beneath the front access door or gate 36. The electric generator 56 and the fire extinguisher 82 are protectively located on the generator platform 78 behind the front access door or gate 36 which, of course, can include a locking mechanism.

FIG. 5 illustrates the configuration of the roll-off self-powered fuel dispensing platform system 10 for use in the dispensing mode. In the dispensing mode either of the access doors or gates 36 or 38 is used to allow an operator access behind the security fence 33 to erect the pivotally collapsible gravity operated fuel distribution hose support 54, the pivotally collapsible light standard 50, and the vent 46. The access door or gate 36 must first be opened as shown by arrow 96 to allow for pivotal repositioning of the pivotable arm assembly 58 as shown by arrow 98 about the pivot housings 66 and 68 and the pivot brackets 70 and 72. Pivotal repositioning of the pivotable arm assembly 58 is instrumental in transporting the electric generator 56 as well as the fire extinguisher 82 a safe distance from the centrally located components of the invention such as the fuel vessel or fuel tank 42, the fuel pumping and metering unit 44 and other critical components. Subsequent to disengagement of the pin 84 from the hole 81 in the base 14 and from the cylindrical sleeve 83, the pivotable arm assembly 58 is pivotally repositioned as indicated by arrow 98. Pivotal repositioning of the pivotable arm assembly 58 provides for alignment of the locking tab 74 of the pivotable arm assembly 58 with the locking tab 76 located on the support plate 24. The pin 84 is then inserted through the aligned body holes located in the aligned locking tabs 74 and 76 to positionally secure the pivotable arm assembly 58 at a safe distance from the fuel vessel or fuel tank 42, the fuel pumping and metering unit 44 and other critical components. The electric generator 56 can be started at the position shown to be utilized to provide power for the fuel pumping and metering unit 44, the light 52 and other externally located devices as required. Furthermore, during generator operation, the access doors or gates 36 and 38 can be locked closed to deny access to the components such as the fuel pumping and metering unit 44 located inside the security fence 33, if desired.

Various modifications can be made to the present invention without departing from the apparent scope hereof.

ROLL-OFF SELF-POWERED FUEL DISPENSING PLATFORM SYSTEM

PARTS LIST

| | |
|---|---|
| 10 | roll-off self-powered fuel dispensing platform system |
| 12 | roll-off platform assembly |
| 14 | base |
| 16 | skid |
| 18 | skid |
| 20 | box tube |
| 22 | box tube |
| 24 | support plate |
| 26 | hooking assembly |
| 28 | support plate |
| 30 | support plate |
| 31 | support plate |
| 32 | roller assembly |
| 33 | security fence |
| 34a–n | standards |
| 36 | front access door or gate |
| 38 | side access door or gate |
| 40 | woven wire mesh |
| 42 | fuel vessel or fuel tank |
| 44 | fuel pumping and metering unit |
| 46 | vent |
| 48 | filler tube |
| 50 | collapsible light standard |
| 52 | light |
| 53 | light switch |
| 54 | collapsible fuel distribution hose support |
| 55 | fuel nozzle support |
| 56 | electric generator |
| 58 | pivotable arm assembly |
| 60 | pivot arm |
| 62 | support tube |
| 64 | support bar |
| 66 | pivot housing |
| 68 | pivot housing |
| 70 | pivot bracket |
| 72 | pivot bracket |
| 74 | locking tab |
| 76 | locking tab |
| 78 | generator platform |
| 81 | hole |
| 82 | fire extinguisher |
| 83 | cylindrical sleeve |
| 84 | pin |
| 85 | support bar |
| 86 | support assembly |
| 87 | support bar |
| 88 | clamp |
| 89 | orifice |
| 90 | clamp |
| 92 | fuel distribution hose |
| 94 | fuel nozzle |
| 96 | arrow |
| 98 | arrow |

What is claimed is:

1. A roll-off self-powered fuel dispensing platform system comprising:

a. a roll-off platform assembly means;

b. said roll-off platform assembly means including a fuel tank;

c. a pump connected to said fuel tank for pumping fuel from said fuel tank;

d. said roll-off platform assembly means including a pivot means on a forward end thereof;

e. an arm means with a means to power said pump mounted on said pivot means, said arm means being pivotable from a first position whereat said means to power said pump is located adjacent to said fuel tank and pump to a use position whereat said means to power said pump is located away from said fuel tank and pump, thereby distancing said means to power said pump from said fuel tank and pump.

2. The system of claim 1, whereby said roll-off platform assembly means includes a fence means around said fuel tank and pump.

3. The system of claim 2, wherein said fence means includes a gate.

4. The system of claim 1, whereby said roll-off platform assembly means includes a light pole means.

5. A roll-off self-powered fuel dispensing platform system, comprising: a roll-off platform assembly including a base on which is mounted a fuel tank, a pump connected to said fuel tank for pumping fuel from said fuel tank, and a pivotable arm assembly supporting a generator for powering said pump; said pivotable arm assembly being pivotable from a first position at which said generator is located near to said fuel tank and pump to a second position at which said generator is located far from said fuel tank and pump.

6. The system of claim 5, wherein said roll-off platform assembly further includes a fence mounted on said base, said fence surrounding said fuel tank and said pump.

7. The system of claim 6, wherein said pivotable arm assembly is located outside said fence and has a first end which is pivotally attached to said base and a second end to which is attached a platform that extends beneath said fence from outside said fence to inside said fence such that a portion of said platform resides outside said fence and a portion of said platform resides inside said fence, the portion of said platform which resides inside said fence supporting said generator.

8. The system of claim 7, wherein said fence includes a gate at the position at which said platform extends therebeneath.

9. The system of claim 6, wherein said roll-off platform assembly further includes an area lighting apparatus mounted on said base inside said fence.

10. The system of claim 5, wherein said generator is an electric generator.

11. The system of claim 5, wherein a meter is associated with said pump.

12. The system of claim 5, wherein said roll-off platform assembly further includes a forward hooking assembly for use in pulling or otherwise transporting.

13. The system of claim 5, wherein said pump includes a fuel distribution hose having a nozzle.

* * * * *